(12) United States Patent
Nakagawa et al.

(10) Patent No.: US 9,931,912 B2
(45) Date of Patent: Apr. 3, 2018

(54) COLLAR, AND VEHICLE SUN VISOR PROVIDED WITH SAID COLLAR

(71) Applicants: PIOLAX, INC., Yokohama-shi (JP); KASAI KOGYO CO., LTD., Koza-gun (JP)

(72) Inventors: Moto Nakagawa, Yokohama (JP); Ryou Aoki, Yokohama (JP); Tomoya Shiraishi, Kanagawa (JP)

(73) Assignees: PIOLAX, INC., Yokohama-Shi, Kanagawa (JP); KASAI KOGYO CO., LTD., Koza-Gun, Kanagawa (JP)

( * ) Notice: Subject to any disclaimer, the term of this patent is extended or adjusted under 35 U.S.C. 154(b) by 21 days.

(21) Appl. No.: 14/916,553

(22) PCT Filed: Aug. 20, 2014

(86) PCT No.: PCT/JP2014/004270
§ 371 (c)(1),
(2) Date: Mar. 3, 2016

(87) PCT Pub. No.: WO2015/040786
PCT Pub. Date: Mar. 26, 2015

(65) Prior Publication Data
US 2016/0193901 A1 Jul. 7, 2016

(30) Foreign Application Priority Data
Sep. 18, 2013 (JP) ................................. 2013-193255

(51) Int. Cl.
B60J 3/02 (2006.01)
(52) U.S. Cl.
CPC ........... *B60J 3/0265* (2013.01); *B60J 3/0273* (2013.01); *B60J 3/023* (2013.01)

(58) Field of Classification Search
CPC .......................................................... B60J 3/02
(Continued)

(56) References Cited

U.S. PATENT DOCUMENTS 4,148,519 A * 4/1979 Hollar, Jr. ............. B60J 3/0265
248/289.11
4,953,064 A * 8/1990 Viertel ..................... B60J 3/023
296/97.5

(Continued)

FOREIGN PATENT DOCUMENTS

CN 1743194 A 3/2006
JP S 63-18320 U 2/1988

(Continued)

OTHER PUBLICATIONS

International Search Report (ISR) (PCT Form PCT/ISA/210), in PCT/JP2014/004270, dated Oct. 21, 2014.

(Continued)

*Primary Examiner* — D Glenn Dayoan
*Assistant Examiner* — Sunsurraye Westbrook
(74) *Attorney, Agent, or Firm* — McGinn I.P. Law Group, PLLC.

(57) ABSTRACT

A collar for a vehicle sun visor includes a pair of collar halves attached on a shaft body. The collar halves each include a receiving groove, a first locking hole and a second locking hole, and a first flexible claw and a second flexible claw. When the pair of collar halves is assembled, the flexible claw of one of the collar halves is inserted into and engages with the locking hole in the other of the collar halves, and the locking holes and the flexible claws are provided pair-wise and arranged opposite one another with the receiving groove therebetween.

14 Claims, 4 Drawing Sheets

(58) Field of Classification Search
USPC .......................................................... 296/97.9
See application file for complete search history.

(56) References Cited

U.S. PATENT DOCUMENTS

| | | | | |
|---|---|---|---|---|
| 5,107,569 | A * | 4/1992 | Hughes ................. | B60J 3/0213 |
| | | | | 16/2.1 |
| 6,264,264 | B1 * | 7/2001 | Kato ..................... | B60J 3/0265 |
| | | | | 296/97.12 |
| 7,458,628 | B2 * | 12/2008 | Torii ...................... | B60J 3/0204 |
| | | | | 296/97.12 |
| 8,845,000 | B2 * | 9/2014 | Asai ...................... | B60J 3/0265 |
| | | | | 296/97.11 |
| 2005/0264023 | A1 | 12/2005 | Torii | |

FOREIGN PATENT DOCUMENTS

| | | |
|---|---|---|
| JP | H10-278580 A | 10/1998 |
| JP | 2002-103968 A | 4/2002 |
| JP | 2002-192948 A | 7/2002 |
| JP | 2003-341361 A | 12/2003 |
| JP | 2004-136751 A | 5/2004 |
| JP | 2005-335546 A | 12/2005 |

OTHER PUBLICATIONS

Chinese Office Action dated Apr. 27, 2017 with an English translation thereof.

* cited by examiner

COLLAR, AND VEHICLE SUN VISOR PROVIDED WITH SAID COLLAR

TECHNICAL FIELD

The present invention relates to a collar including a pair of half-split bodies, and a sun visor for a vehicle provided with the same.

BACKGROUND ART

A sun visor is provided on a ceiling surface in front of the driver's and passenger's seats in a vehicle to protect the eyes of the driver and the like from direct sunlight and to secure his/her sight. The sun visor is disposed such that the position thereof is adjustable with respect to the position of the sun.

The sun visor for a vehicle described in Patent Document 1 includes a sun visor body, a shaft body mounted on the sun visor body so as to support the sun visor body, and a cylindrical body arranged to cover the shaft body so as to be hooked and locked by a hook on a cabin ceiling surface. The cylindrical body includes two split bodies that can be assembled from the outer circumferential side of the shaft body. One of the split bodies includes an elastically-deformable engaging pawl that protrudes in the opposing direction, and the other includes an engaged portion engageable with the engaging pawl on its inner face.

CITATION LIST

Patent Literature

Patent Document 1

JP-2002-192948-A

SUMMARY OF THE INVENTION

Problem that the Invention is to Solve

However, in the technique described in Patent Document 1, one split body and the other split body have different structures. Thus, two molds are required in manufacturing, and manufacturing cost is increased.

The present invention is made in view of the above-described problem, and an object of the present invention is to provide a technique that can reduce the cost for manufacturing by realizing a collar configured of combinable half-split bodies of the same shape.

Means for Solving the Problem

To solve the above-described problem, one embodiment of the present invention provides a collar mounted on a shaft body that supports a shielding body of a sun visor for a vehicle, the collar including:

a pair of half-split bodies that is mounted on the shaft body by sandwiching an outer circumference of the shaft body, wherein each of the half-split bodies includes:

an accommodation groove formed on an inner face of each of the half-split bodies so as to accommodate a part of the shaft body;

engagement hole portions formed on the inner face of each of the half-split bodies by being cut out; and bendable pawl portions formed to stand from the inner face of each of the half-split bodies and to have flexibility, wherein, when the pair of half-split bodies is combined, the bendable pawl portions of one of the half-split bodies are inserted into and engaged with the engagement hole portions of the other one of the half-split bodies, and wherein each of the engagement hole portions and a corresponding one of the bendable pawl portions are paired such that the accommodation groove is interposed between the pairs of engagement hole portions and the bendable pawl portions.

According to the present embodiment, only combining and pressing a pair of half-split bodies against each other can bend the bendable pawl portions to be engaged with the engagement hole portions. Thus, the pair of half-split bodies can to be mounted on the outer circumference of the shaft body through one-touch operation. Since the paired half-split bodies have the same shape, the manufacturing cost can be reduced. An operational feeling is provided to users when the bendable pawl portions are engaged with the engagement hole portions, by which the users can easily check the mounting state.

Advantageous Effects of Invention

According to the present invention, since a collar is configured by combining half-split bodies of the same shape, the manufacturing cost can be reduced.

MODE FOR CARRYING OUT THE INVENTION

Figure 1A:
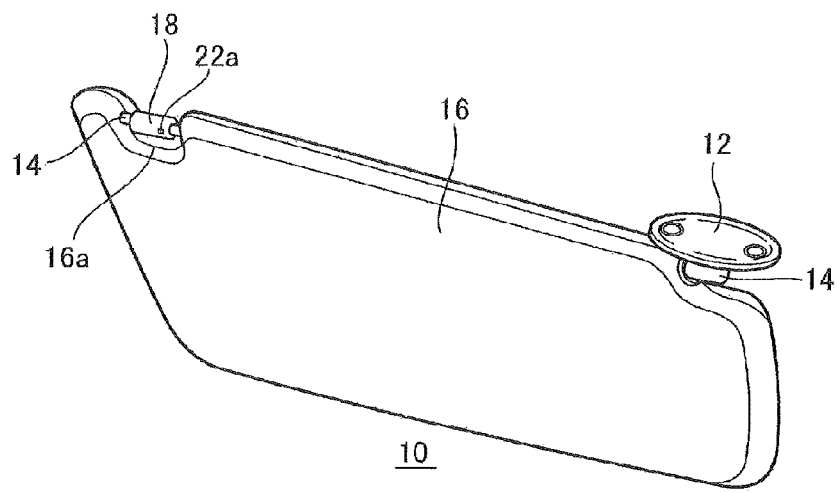
FIG. 1A is a perspective view of a sun visor.
Figure 1B:
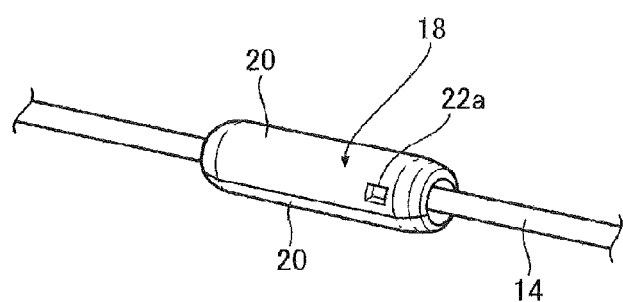
FIG. 1B is a partial perspective view of the sun visor where attention is focused on a collar.

FIG. 1A is a perspective view of a sun visor 10, and FIG. 1B is a partial perspective view of the sun visor 10 where attention is focused on a collar 18. The sun visor 10 is fixed to a vehicle body panel of a ceiling of drivers' seats and passengers' seats in vehicles, and used to prevent the drivers and the passengers from being dazzled or dizzied by sunlight or light of oncoming cars. The sun visor 10 is rotatable connected to the vehicle body such that the position of the sun visor 10 is adjustable.

The sun visor 10 includes a mounting portion 12, a shaft body 14, a shielding body 16, and a collar 18. The sun visor 10 is rotatably mounted to the vehicle body via the mounting portion 12. The shielding body 16 has a flat plate shape, and the shaft body 14 is incorporated in the shielding body 16 by penetrating therethrough, so as to support the shielding body 16. The shaft body 14 continues along the outer shape of the shielding body 16, and both the ends of the shaft body 14 are connected to the mounting portion 12. The shaft body 14 is made from metal, and the shielding body 16 and the collar 18 are made from resin.

The shielding body 16 includes a notch 16a from which a part of the shaft body 14 is exposed. The collar 18 is disposed on the outer periphery of the shaft body 14 as shown in FIG. 1B. The collar 18 is locked by a locking portion (not illustrated) such as a hook provided on the vehicle body. The shielding body 16 is rotatable while the collar 18 is locked by the hook. When adjusting the position of the sun visor 10, while the driver or the like rotates the sun visor 10 in a state where the collar 18 is locked by the hook, the driver or the like can release the lock of the collar 18 by the hook and rotate the shielding body 16. To be specific, the sun visor 10 can be brought into two states: one is a state where the sun visor 10 is supported only by the mounting portion 12, and the other is a state where not only the sun visor 10 is supported by the mounting portion 12 but also the collar 18 is locked by the hook. The shielding body 16 can be moved in any state.

The collar 18 includes a pair of half-split bodies 20 that is mounted on the shaft body 14 while sandwiching the outer circumference of the shaft body 14. The collar 18 has a circular cylindrical shape, and is configured by combining the half-split bodies 20 of the same shape. The loads in a variety of directions transitioned to the collar 18 include not only a load from the outside of the collar 18 that is received from the hook that locks the collar 18, but also a load from the inside of the collar 18 that is received from the shaft body 14 inside the collar 18. A detailed description of the half-split bodies 20 will be provided based on the part drawings. Same or equivalent constituent elements shown in the drawings are provided with same reference numerals, and repeated descriptions of the same or equivalent constituent elements are omitted as appropriate.

Figure 2A:
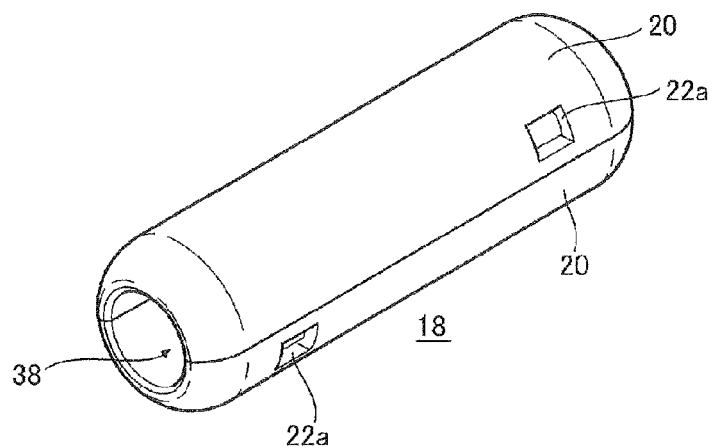
FIG. 2A is a perspective view of the collar.
Figure 2B:
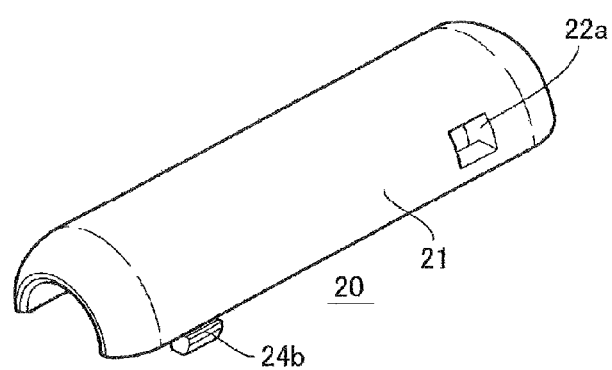
FIG. 2B is a perspective view of a half-split body showing the outside thereof.
Figure 2C:
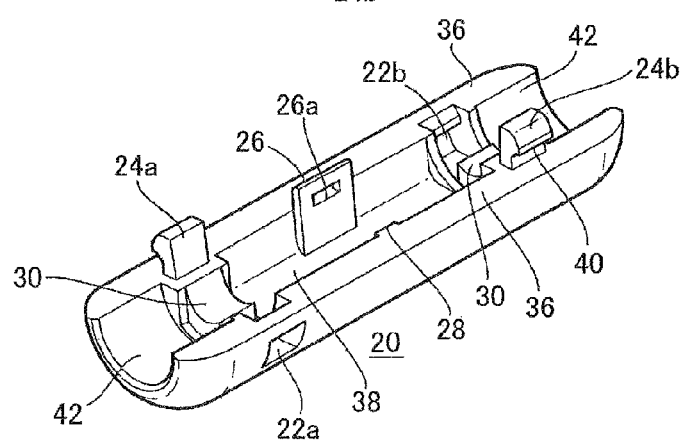
FIG. 2C is a perspective view of the half-split body showing the inside thereof.
Figure 3A:
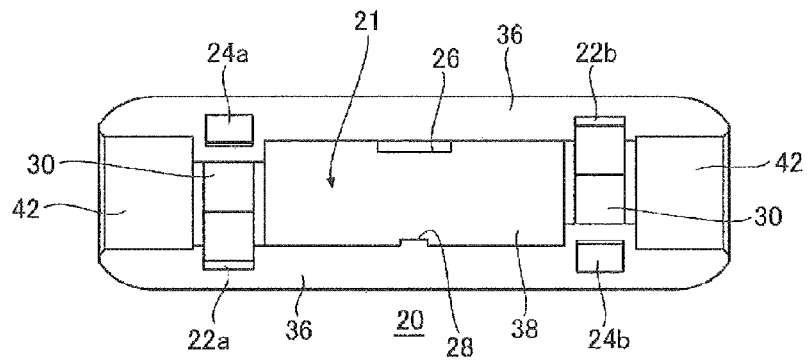
FIG. 3A is a front view of the half-split body showing the inside thereof.
Figure 3B:
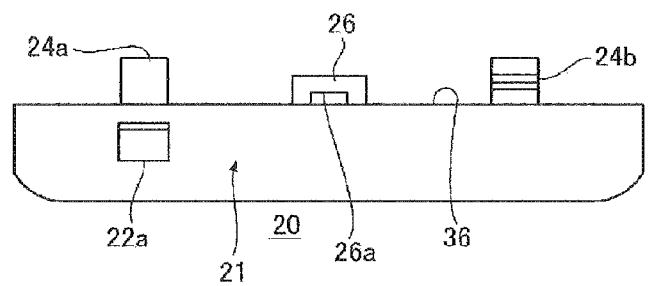
FIG. 3B is a side view of the half-split body.
Figure 3C:
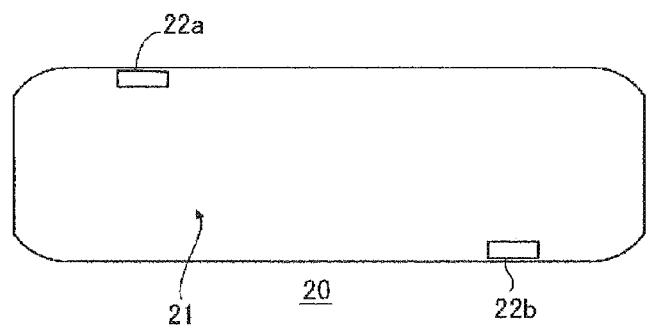
FIG. 3C is a front view of the half-split body showing the outside thereof.
Figure 3D:
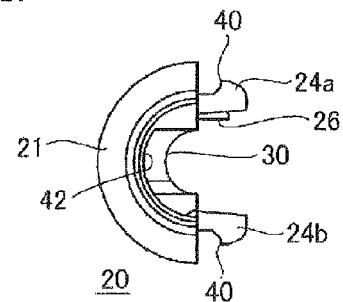
FIG. 3D is an end view of the half-split body showing the lateral side thereof.

FIG. 2A is a perspective view of the collar 18, FIG. 2B is a perspective view of the half-split body 20 showing the outside thereof, and FIG. 2C is a perspective view of the half-split body 20 showing the inside thereof. FIG. 3A is a front view of the half-split body 20 showing the inside thereof, FIG. 3B is a side view of the half-split body 20, FIG. 3C is a front view of the half-split body 20 showing the outside thereof, and FIG. 3D is an end view of the half-split body 20 showing the lateral side thereof.

The collar 18 is made by combining a pair of half-split bodies 20, and includes an accommodation groove 38 disposed on an inner face of the collar 18 so as to accommodate the shaft body 14 as shown in FIG. 2A. The accommodation grooves 38 of the half-split bodies 20 form an accommodation space for the shaft body 14. Since the half-split bodies 20 has the same shape, it can be molded only with one kind of mold. Thus, the manufacturing cost can be reduced as compared with the case of manufacturing the collar 18 configured of combinable half-split bodies of different shapes.

The half-split body 20 includes a main body portion 21, a first engagement hole portion 22a and a second engagement hole portion 22b (referred to as the engagement hole portions 22 when they are not distinguished from each other), a first bendable pawl portion 24a and a second bendable pawl portion 24b (referred to as the bendable pawl portions 24 when they are not distinguished from each other), a connecting portion 26, a connected portion 28, grip portions 30, mating faces 36, and the accommodation groove 38.

The outer peripheral face of the main body portion 21 of the half-split body 20 has a semicircular cylindrical shape as shown in FIG. 2B. The first engagement hole portion 22a and the second engagement hole portion 22b (not illustrated) penetrate through the main body portion 21 from the inside to the outside up to the outer peripheral face thereof. The inner face of the half-split body 20 defines a face that is disposed inside of the circular cylindrical shape when making the collar 18. The inner face includes the grip portions 30, the mating faces 36, and the accommodation groove 38.

As shown in FIG. 2C, on the inner face of the half-split body 20, the accommodation groove 38 that extends along the central axis is disposed, and the pair of mating faces 36 along the central axis are provided to the edges of the accommodation groove 38. The mating faces 36 are disposed on the edges on the inner face of the half-split body 20 across the accommodation groove 38 from each other. The accommodation groove 38 is arranged to secure an accommodation space to accommodate a part of the shaft body 14. The mating faces 36 define flat surfaces that are, when a pair of half-split bodies 20 are combined, brought into contact with the mating faces 36 of the other half-split body 20.

The bendable pawl portions 24 stand from the mating faces 36 and have flexibility. The bendable pawl portions 24 include a protruding portion 40 that protrudes in a direction crossing the standing direction of the bendable pawl portions 24. The protruding portions 40 protrude in a radial outer direction with respect to the central axis of the half-split body 20. The engagement hole portions 22 are made by cutting out the mating faces 36. When a pair of half-split bodies 20 are combined, the bendable pawl portions 24 of one of the half-split bodies 20 are inserted into and engaged with the engagement hole portions 22 of the other half-split body 20. The protruding portions 40 of the bendable pawl portions 24 are caught in the engagement hole portions 22. The engagement hole portions 22 and the bendable pawl portions 24 may be provided so as to partially spread from the mating faces 36 over the accommodation groove 38. The engagement hole portions 22 and the bendable pawl portions 24 may be disposed in the accommodation groove 38. Even in such a case, the engagement hole portions 22 and the bendable pawl portions 24 are opposed across the accommodation groove 38 from each other, so that the shaft body 14 is disposed between the engagement hole portions 22 and the bendable pawl portions 24. The engagement hole portions 22 and the bendable pawl portions 24 are provided to the mating faces 36 or/and to the accommodation groove 38 that define the inner face of the half-split body 20.

The first engagement hole portion 22a and the first bendable pawl portion 24a are opposed across the accommodation groove 38 from each other, and the second engagement hole portion 22b and the second bendable pawl portion 24ab are opposed across the accommodation groove 38 from each other. And, when combining the half-split bodies 20 of the same shape, the bendable pawl portions 24 can be engaged with the engagement hole portions 22. Thus, only by combining and pressing the mating faces 36 of a pair of half-split bodies 20 against each other, the collar 18 can be mounted on the outer circumference of the shaft body 14 through one-touch operation. Since the bendable pawl portions 24 are engaged with the engagement hole portions 22, the collar 18 can be prevented from being split in the opposing direction of the half-split bodies 20, and a positional displacement of the shaft body 14 in the axial direction can be prevented. An operational feeling is provided to users when the bendable pawl portions 24 are engaged with the engagement hole portions 22, by which the users can easily check the mounting state.

The paired engagement hole portion 22 and bendable pawl portion 24 are provided to each of both end portion sides of the half-split body 20 in the axial direction. The paired engagement hole portion 22 and bendable pawl portion 24 are opposed across the accommodation groove 38 from each other. The both end portion sides in the axial direction are not limited to the terminals of the half-split body 20, and include positions slightly closer to the center than the terminals. With this configuration, the both end portion sides of the collar 18 are fixed, so that the bendable pawl portions 24 are unlikely to be disengaged from the engagement hole portions 22 when the shaft body 14 is twisted can be reduced. In addition, with this configuration, the both end portion sides of the half-split body 20 can be prevented from being warped outward.

The grip portions 30 are disposed on the both end portion sides of the half-split body 20 in the axial direction, so as to grip the shaft body 14. As shown in FIG. 3D, the grip portions 30 have an inner peripheral face smaller in diameter than the accommodation groove 38. The inside diameter of the grip portions 30 is set in accordance with the outside diameter of the shaft body 14, and is set to be slightly larger than the outside diameter of the shaft body 14. Each of the grip portions 30 is disposed along the line where respective one of pairs of the bendable pawl portions 24 and the engagement hole portions 22 is opposed to each other at the respective position in the axial direction. To be specific, the grip portions 30 are formed on the inner face of the accommodation groove 38 along the opposed pairs of the engagement hole portions 22 and the bendable pawl portions 24, respectively. Thus, the grip portions 30 disposed on the both sides in the axial direction press the shaft body 14, and the bendable pawl portions 24 are engaged with the engagement hole portions 22 at the positions in the axial direction where the grip portions 30 press the shaft body 14, whereby the collar 18 can be prevented from being deformed at their both end portion sides. Since each of the grip portions 30 is disposed on the line where the respective pair of the bendable pawl portion 24 and the engagement hole portion 22 are opposed to each other, a load from the shaft body 14 the is applied to the vicinities of the grip portions 30 where the collar 18 can be prevented from being split in the opposing direction of the half-split bodies 20. A part of the main body portion 21 disposed more outside than the grip portions 30 in the axial direction is not indispensable, and the grip portions 30 may be disposed at the terminals. The shaft body 14 slides on the inner faces of the grip portions 30 in the mounting state.

The connecting portion 26 extends out from the mating face 36 along the direction of inserting the bendable pawl portions 24 into the engagement hole portions 22, and a concave portion 26a is provided to the portion of the connecting portion 26 that extends out over the mating face 36. The connected portion 28 has a convex shape and fits into the concave portion 26a so as to be connected therewith. The connecting portion 26 and the connected portion 28 are opposed across the accommodation groove 38 from each other. When a pair of half-split bodies 20 is combined, the connecting portion 26 of one of the half-split bodies 20 is connected with the connected portion 28 of the other half-split body 20, whereby a positional displacement of the mating faces 36 that are mated with each other in the opposing direction, and a positional displacement of the shaft body 14 in the axial direction are limited. Providing the concave portion 26a to the connecting portion 26 that extends out over the half-split body 20 can prevent a concave to be formed on the inner face of the accommodation groove 38 of the half-split body 20. Thus, the main body portion 21 can be prevented from being weakened in stiffness, and thus prevented from being deformed. As long as the concave portion 26a has a depth within the board thickness of the connecting portion 26 while being not deep enough to reach the accommodation groove 38, the connecting portion 26 need not extend out over the mating face 36 along the insertion direction. As long as the connecting portion 26 is disposed between the first engagement hole portion 22a and the first bendable pawl portion 24a and the second engagement hole portion 22b and the second bendable pawl portion 24b, the connecting portion 26 may extend out over the inner face of the half-split body 20, that is, from the mating face 36 and/or the accommodation groove 38.

The paired connecting portion 26 and connected portion 28 opposed across the accommodation groove 38 from each other are disposed between the pairs of the engagement hole portions 22 and the bendable pawl portions 24 on the both end portion sides. Thus, while the half-split bodies 20 can be engaged firmly with each other at their both end portion sides by the engagement hole portions 22 and the bendable pawl portions 24, the half-split bodies 20 can be prevented from jutting at the central portions by the connecting portions 26 and connected portions 28. The connecting portions 26 and connected portions 28 are disposed so as not to grip the shaft body 14 in a state where the half-split bodies 20 are mounted on the shaft body 14. Since the central portion of the collar 18 can be made not to be in contact with the shaft body 14, the influence of distortion caused by a load applied by the shaft body 14 can be reduced.

The accommodation groove 38 includes large-diameter portions 42 having inner faces large in diameter on its both end portion sides. The large-diameter portions 42 allow the cover of the shielding body 16 to get into the inside of the collar 18.

Figure 4A:
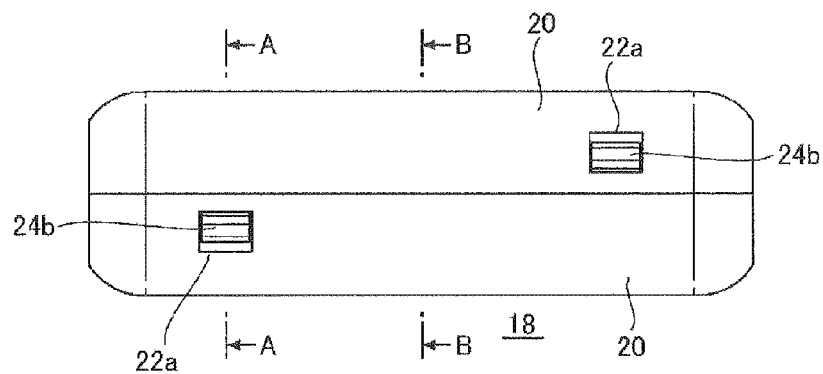
FIG. 4A is a side view of the collar.
Figure 4B:
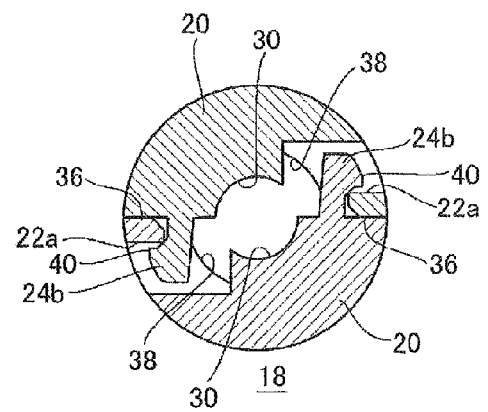
FIG. 4B is a cross-sectional view of the collar taken along the line A-A of FIG. 4A.
Figure 4C:
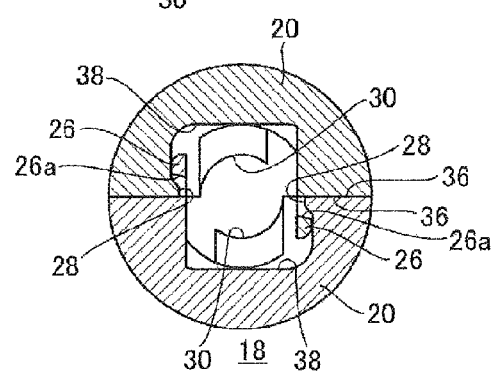
FIG. 4C is a cross-sectional view of the collar taken along the line B-B of FIG. 4A.

FIG. 4A is a side view of the collar 18, FIG. 4B is a cross-sectional view of the collar 18 taken along the line A-A of FIG. 4A, and FIG. 4C is a cross-sectional view of the collar 18 taken along the line B-B of FIG. 4A.

As shown in FIG. 4B, the protruding portions 40 of the bendable pawl portions 24 protrude along the mating faces 36 toward the outer faces, and protrude in the directions crossing the standing directions of the bendable pawl portions 24. The engagement hole portions 22 penetrate through the half-split bodies 20 up to the outer faces also in the directions crossing the standing directions of the bendable pawl portions 24. Since the protruding portions 40 of the bendable pawl portions 24 can be made to protrude to the outer faces of the half-split bodies 20, the overlapping amounts between the engagement hole portions 22 and the protruding portions 40 of the bendable pawl portions 24 can be secured, and the collar 18 can be further prevented from being split in the opposing direction of the half-split bodies 20. The protruding portions 40 are disposed with respect to the engagement hole portions 22 such that the edges of the engagement hole portions 22 are sandwiched between the protruding portions 40 and the mating faces 36. The engagement hole portions 22 are dented in the opposing direction of the mating faces 36, then bent at right angles or into the direction crossing the opposing direction, and extends along the extending direction of the mating faces 36, thereby penetrating up to the outer faces.

The bendable pawl portions 24 are engaged with the engagement hole portions 22 while being bent in the radial inner direction. The bendable pawl portions 24 are engaged with the engagement hole portions 22 while being urged.

Thus, the bendable pawl portions 24 can be more tolerant against a positional displacement of the mating faces 36 in the radial direction, and a positional displacement of the half-split bodies 20 can be prevented. As the bendable pawl portions 24 engages with the engagement hole portions 22 while being bent, manufacturing errors can be absorbed to bring the mating faces 36 into contact with each other accurately.

As shown in FIG. 4C, the connected portions 28 having a convex shape are inserted into and connected with the concave portions 26a of the connecting portions 26. The connecting portions 26 and the connected portions 28 are disposed more outside than the inner peripheral faces of the grip portions 30 in the radial direction when seen in the axial direction. Thus, the connecting portions 26 and the connected portions 28 can be disposed so as not to be in contact with the shaft body 14. The connecting portions 26 extend out in the opposing direction of the half-split bodies 20. When a pair of half-split bodies 20 are combined, the connecting portions 26 function as guides.

The present invention is not limited to the embodiment described above, and it is also possible to add modifications such as various kinds of design changes to the embodiments based on the knowledge of those skilled in the art. Embodiments to which such modifications are added can also be included within the scope of the present invention. It is also possible to combine the modifications.

While the connecting portions 26 are engaged with the connected portions 28 by the male-female fitting in the present embodiment, convex portions may be provided to the inner wall faces of the connecting portions 26, and concave portions may be provided as the connected portions 28 to the inner peripheral faces of the opposed accommodation grooves 38.

DESCRIPTION OF REFERENCE NUMERALS AND SIGNS

10 Sun visor
12 Mounting portion
14 Shaft body
16 Shielding body
18 Collar
20 Half-split body
21 Main body portion
22 Engagement hole portion
22a First engagement hole portion
22b Second engagement hole portion
24 Bendable pawl portion
24a First bendable pawl portion
24b Second bendable pawl portion
26 Connecting portion
26a Concave portion
28 Connected portion
30 Grip portion,
36 Mating face,
38 Accommodation groove, and
40 Protruding portion.

INDUSTRIAL APPLICABILITY

The present invention relates to a collar including a pair of half-split bodies, and a sun visor for a vehicle provided with the same.

The invention claimed is:

1. A collar mounted on a shaft body that supports a shielding body of a sun visor for a vehicle, the collar including:
   a pair of half-split bodies that is mounted on the shaft body by sandwiching an outer circumference of the shaft body,
   wherein each of the half-split bodies includes:
      an accommodation groove formed on an inner face of each of the half-split bodies so as to accommodate a part of the shaft body;
      engagement hole portions formed on the inner face of each of the half-split bodies by being cut out;
      bendable pawl portions formed to stand from the inner face of each of the half-split bodies and to have flexibility; and
      mating faces formed on inner faces of the half-split bodies,
   wherein, when the pair of half-split bodies is combined, the bendable pawl portions of one of the half-split bodies are inserted into and engaged with the engagement hole portions of an other one of the half-split bodies such that the bendable pawl portions fixedly attach the pair of half-split bodies to each other via being engaged with the engagement hole portions, and
   wherein each of the engagement hole portions and a corresponding one of the bendable pawl portions are paired on both end portion sides such that the accommodation groove is interposed between the pairs of engagement hole portions and the bendable pawl portions,
   wherein each of the half-split bodies further includes a connecting portion and a connected portion that are opposed across the accommodation groove from each other and disposed between the pairs of the engagement hole portions and the bendable pawl portions on the both end portion sides,
   wherein the connecting portion extends out from the inner face of each of the half-split bodies along a direction of inserting the bendable pawl portions into the engagement hole portions, and includes a concave portion arranged to fit into the connected portion,
   wherein the connected portion includes a convex portion arranged to fit into the concave portion,
   wherein, when the pair of half-split bodies is combined, the concave portion of one of the half-split bodies is connected with the convex portion of an other one of the half-split bodies, so that a positional displacement of the pair of half-split bodies in an opposing direction and in an axial direction are limited,
   wherein the mating faces are brought into contact with each other when the half-split bodies are combined,
   wherein the connecting portions extend out from mating faces along the direction of inserting the bendable pawl portions into the engagement hole portions, and
   wherein the concave portion is formed in a portion of the connecting portion that extends out over the mating face, and at a position away from both side faces of the connecting portion in the axial direction of the shaft body.

2. The collar of claim 1,
   wherein each of the half-split bodies includes mating faces that s disposed on the inner face, and when the pair of half-split bodies is combined, the mating faces are brought into contact with each other, and
   wherein the connecting portions extend out over the mating faces in the insertion direction, and when the pair of half-split bodies is combined, the connecting portions are brought into contact with the accommodation grooves.

3. The collar of claim 1,
wherein each of the half-split bodies includes grip portions disposed on both end portion sides of each of the half-split bodies in an axial direction so as to grip the shaft body,
wherein the grip portions are disposed on the accommodation groove along the pairs of the bendable pawl portions and the engagement hole portions, respectively, and
wherein the connecting portions and the connected portions are disposed more outside than inner peripheral faces of the grip portions in a radial direction when seen in the axial direction in a state where the half-split bodies are mounted on the shaft body.

4. The collar of claim 1,
wherein the engagement hole portions are engaged with the bendable pawl portions such that the bendable pawl portions are bent inward in the radial direction.

5. The collar of claim 1,
wherein the engagement hole portions penetrate through each of the half-split bodies up to an outer face thereof.

6. A sun visor for a vehicle, the sun visor including:
a shielding body configured to shield light;
a shaft body configured to support the shielding body; and
a collar including a pair of half-split bodies that is mounted on the shaft body by sandwiching an outer circumference of the shaft body, so as to be locked on a locking portion provided on the vehicle,
wherein each of the half-split bodies includes:
an accommodation groove formed on an inner face of each of the half-split bodies so as to accommodate a part of the shaft body;
engagement hole portions formed on the inner face of each of the half-split bodies, so as to penetrate through each of the half-split bodies up to an outer face thereof; and
bendable pawl portions formed to stand from the inner face of each of the half-split bodies and to have flexibility,
wherein, when the pair of half-split bodies is combined, the bendable pawl portions of one of the half-split bodies are inserted into and engaged with the engagement hole portions of an other one of the half-split bodies such that the bendable pawl portions fixedly attach the pair of half-split bodies to each other via being engaged with the engagement hole portions, so as not to protrude beyond the outside surfaces of the half-split bodies,
wherein each of the engagement hole portions and a corresponding one of the bendable pawl portions are paired such that the accommodation groove is interposed between the pairs of engagement hole portions and the bendable pawl portions, and
wherein, when the pair of half-split bodies are combined, the bendable pawl portions are exposed through the engagement hole portions to the outside.

7. A collar mounted on a shaft body that supports a shielding body of a sun visor for a vehicle, so as to be locked on a locking portion provided on the vehicle, the collar including:
a pair of half-split bodies that is mounted on the shaft body by sandwiching an outer circumference of the shaft body,
wherein each of the half-split bodies includes:
an accommodation groove formed on an inner face of each of the half-split bodies so as to accommodate a part of the shaft body;
engagement hole portions formed on the inner face of each of the half-split bodies by being cut out, so as to penetrate through each of the half-split bodies up to an outer face thereof; and
bendable pawl portions formed to stand from the inner face of each of the half-split bodies and to have flexibility,
wherein, when the pair of half-split bodies is combined, the bendable pawl portions of one of the half-split bodies are inserted into and engaged with the engagement hole portions of an other one of the half-split bodies such that the bendable pawl portions fixedly attach the pair of half-split bodies to each other via being engaged with the engagement hole portions, so as not to protrude beyond the outside surfaces of the half-split bodies,
wherein each of the engagement hole portions and a corresponding one of the bendable pawl portions are paired such that the accommodation groove is interposed between the pairs of engagement hole portions and the bendable pawl portions, and
wherein, when the pair of half-split bodies are combined, the bendable pawl portions are exposed through the engagement hole portions to the outside.

8. The collar of claim 7,
wherein each of the half-split bodies further includes a connecting portion and a connected portion that are opposed across the accommodation groove from each other and disposed between the pairs of the engagement hole portions and the bendable pawl portions on both end portion sides, and
wherein, when the pair of half-split bodies is combined, the connecting portion of one of the half-split bodies is connected with the connected portion of the other one of the half-split bodies.

9. The collar of claim 8,
wherein the connecting portion extends out from the inner face of each of the half-split bodies along a direction of inserting the bendable pawl portions into the engagement hole portions, and includes a concave portion arranged to fit into the connected portion, and
wherein the connected portion includes a convex portion arranged to fit into the concave portion.

10. The collar of claim 9,
wherein each of the half-split bodies includes mating faces that is disposed on the inner face, and when the pair of half-split bodies is combined, the mating faces are brought into contact with each other, and
wherein the connecting portions extend out over the mating faces in the insertion direction, and when the pair of half-split bodies is combined, the connecting portions are brought into contact with the accommodation grooves.

11. The collar of claim 7,
wherein each of the half-split bodies includes grip portions disposed on both end portion sides of each of the half-split bodies in an axial direction so as to grip the shaft body,
wherein the grip portions are disposed on the accommodation groove along the pairs of the bendable pawl portions and the engagement hole portions, respectively, and wherein the connecting portions and the connected portions are disposed more outside than inner peripheral faces of the grip portions in a radial direction when seen in the axial direction in a state where the half-split bodies are mounted on the shaft body.

12. The collar of claim 7,
wherein the engagement hole portions are engaged with the bendable pawl portions such that the bendable pawl portions are bent inward in the radial direction.

13. The collar of claim 5, wherein, when the pair of half-split bodies is combined, the bendable pawl portions of one of the half-split bodies are inserted into and through the engagement hole portions of an other one of the half-split bodies.

14. The collar of claim 1, wherein the engagement hole portions are provided at a portion of the inner face of each of the half-split bodies below an upper edge of the inner face of each of the half-split bodies.

* * * * *